United States Patent [19]

Ramberg

[11] Patent Number: 5,433,454
[45] Date of Patent: Jul. 18, 1995

[54] PENETRATION LIMITING GLAND AND METAL GASKET

[75] Inventor: Fred G. Ramberg, Villa Park, Calif.

[73] Assignee: Bostec Engineering, Inc., Villa Park, Calif.

[21] Appl. No.: 190,727

[22] Filed: Feb. 2, 1994

Related U.S. Application Data

[63] Continuation of Ser. No. 951,360, Sep. 25, 1992, abandoned, which is a continuation of Ser. No. 698,011, May 9, 1991, abandoned.

[51] Int. Cl.[6] .................... F16J 15/08; F16L 23/00
[52] U.S. Cl. .................... 277/167.5; 277/180; 277/207 A; 277/236; 285/336; 285/363; 285/917
[58] Field of Search ............................ 277/211

[56] References Cited

U.S. PATENT DOCUMENTS

| | | | |
|---|---|---|---|
| H439 | 3/1988 | Rehn et al. ............... | 285/917 X |
| 1,132,086 | 3/1915 | Goodall .................... | 277/167.5 |
| 1,595,310 | 8/1926 | Mueller et al. ............ | 277/236 |
| 1,819,036 | 8/1931 | Oberhuber ................ | 285/917 X |
| 1,821,866 | 9/1931 | Wilson ...................... | 277/180 X |
| 1,834,581 | 12/1931 | Ferrell et al. .............. | 285/917 X |
| 1,965,273 | 7/1934 | Wilson ...................... | 277/167.5 X |
| 2,919,936 | 1/1960 | Hurley ...................... | 277/167.5 X |
| 2,926,937 | 3/1960 | Parsons .................... | 285/917 X |
| 3,208,758 | 9/1965 | Carlson et al. ............ | 277/236 |
| 3,521,910 | 7/1970 | Callahan, Jr. et al. ..... | 285/328 X |
| 3,989,285 | 11/1976 | Yancey ..................... | 285/336 |
| 4,303,251 | 12/1981 | Harra et al. ............... | 277/167.5 X |
| 4,616,860 | 10/1986 | Faria et al. ................ | 277/167.5 X |
| 4,635,967 | 1/1987 | Stephenson ............... | 285/917 X |
| 4,650,227 | 3/1987 | Babuder et al. ........... | 285/910 X |
| 4,659,118 | 4/1987 | Schwyter et al. .......... | 285/339 X |
| 4,674,756 | 6/1987 | Fallon et al. .............. | 277/211 X |
| 4,854,597 | 8/1989 | Leigh ........................ | 277/167.5 X |
| 4,950,002 | 8/1990 | Hormansdorfer ......... | 285/917 X |
| 4,988,130 | 1/1991 | Obara et al. .............. | 285/917 X |
| 5,040,714 | 8/1991 | McManigal ............... | 277/167.5 X |

FOREIGN PATENT DOCUMENTS

| | | | |
|---|---|---|---|
| 1474122 | 2/1967 | France ...................... | 277/180 |
| 0565462 | 11/1932 | Germany ................... | 277/180 |
| 2638018 | 3/1977 | Germany ................... | 277/236 |
| 3105395 | 11/1982 | Germany ................... | 285/917 |
| 0393855 | 11/1965 | Switzerland .............. | 277/180 |
| 0397603 | 8/1933 | United Kingdom ....... | 285/917 |
| 0758373 | 10/1956 | United Kingdom ....... | 285/353 |
| 0908119 | 10/1962 | United Kingdom ....... | 285/354 |
| 0926789 | 5/1963 | United Kingdom ....... | 277/180 |
| 0609012 | 5/1978 | U.S.S.R. .................... | 277/236 |
| 8903495 | 4/1989 | WIPO ....................... | 277/236 |

OTHER PUBLICATIONS

A. Roth: "Vacuum Sealing Techniques"; Feb. 1970; pp. 330–331, 432–433.

Primary Examiner—William A. Cuchlinski, Jr.
Assistant Examiner—Scott W. Cummings
Attorney, Agent, or Firm—Robbins, Berliner & Carson

[57] ABSTRACT

A leak-tight seal is formed by sandwiching a metal gasket between opposing annular ridges surrounding the port to be sealed. The gasket is of metal soft enough to be penetrated by the ridges and includes an annular flange disposed in grooves adjacent the ridges.

9 Claims, 2 Drawing Sheets

PENETRATION LIMITING GLAND AND METAL GASKET

This is a continuation of copending application Ser. No. 07/951,360 filed on Sep. 25, 1992 now abandoned which is a continuation of Ser. No. 07/698,011 filed on May 9, 1991 now abandoned.

BACKGROUND AND SUMMARY OF THE INVENTION

In the construction of many fluid handling devices, such as flowmeters and flow controllers, it is often critically necessary that the reliability of such sealing mechanisms be maintained under very adverse conditions, for example high temperatures, vacuum conditions of outer space, and conditions involving the passage of highly corrosive gaseous fluids. Such requirements make it undesirable to use conventional non-metal seals such as rubber gaskets and this has given rise to a variety of completely metal vacuum sealing devices, such as using metal O-ring seals, knife edge seals with flat metal gaskets, and the like. The metal vacuum joint described in Carlson et al U.S. Pat. No. 3,208,758 is one approach to the problem in which soft, flat metal gasket is penetrated by annular ridges. However, there are a number of problems that are not solved by such prior metal gasket seals. For example, because the glands themselves are intended to be reused with the replacement of the metal seal, a portion or all of the ridge on one of the glands can become duller than the other with the result that only one side of the gasket may be effectively penetrated. This may compromise the effectiveness of the seal in allowing leakage of fluid past the dull edges, building a "dead volume" of trapped fluid which can then contaminate for subsequent fluid flow. Some means, therefore, is desired to assure that there will be even penetration by the ridges even though one of the ridge surfaces is duller than the other. It would also be desirable to be able to use metal for the gasket, such as nickel, that does not out-gas upon baking and which is impervious to most environments. Nickel, being harder than usual copper metal gaskets, requires that the system design be particularly capable of uniformly and repeatedly applying penetrating forces to the opposing surfaces of the gasket.

In addition, it would be desirable to have the gland design capable of accommodating a variety of other seals so that a single gland design can be utilized to interface with a variety of different devices having varying requirements. For example, it would be desirable to utilize the same gland design to accommodate less demanding seals, such as a rubber O-ring while still providing the advantages of low dead volume and reproducibility. In some cases, it may even be desirable to weld a component to the port defined by the gland and a design which would accommodate, and facilitate, such welding would be highly desirable.

The present invention provides a sealing device having the foregoing desired attributes. A leak-tight seal is formed by sandwiching a rigid but malleable gasket such as a metal or teflon gasket between opposing annular ridges surrounding the port to be sealed. Reproducibility and assurance of proper seating of the annular gland ridges are assured by using a metal gasket design that cooperates with mating surfaces of the gland. In particular, the metal gasket is formed as an annular disk with a central opening and with an annular flange thicker than the disk integral with the disk, and extending vertically from both sides. The flange is disposed in grooves in the gland defined by the piercing ridges and wall structure of the glands and associated free, base surface of the glands. The design is such that it can be used to seal joints with standard rubber O-rings and its structure is such, in particular embodiments, to facilitate welding at the port which it defines, if that is desired.

In the preferred embodiment, in which a flanged metal gasket is sandwiched between opposing glands, a highly effective, reliable sealing device is provided which can withstand adverse temperatures and harsh fluid environments. Because of the particular mating structure between the gland geometry and that of the gasket flange, it is not necessary to have highly polished facing surfaces, as is sometimes the case with prior art mechanisms. The result is an inexpensive, serviceable, easy-to-machine and use device capable of sealing under the most adverse of conditions.

The gland can have a variety of configurations serving not only to surround and seal off a port, but also as a mechanism for sealing within a bore. In one embodiment, complementary glands are disposed in opposed confronting relationship, each gland defining a groove by an annular wall on one side and an annular ridge on the other side of a free, base surface of the gland. The ridge terminates in a sharp edge for piercing the gasket while the groove houses the flange of the gasket. The gasket is an annular disk with a central opening, the flange being located on its circumference as a thickened portion with opposite horizontal surfaces for seating on corresponding flat surfaces of the gland base which lies between the annular ridge and wall.

In another embodiment, the gasket has its flange adjacent the opening. In this embodiment, one of the glands is formed with an opening centrally therethrough while the other is formed with a threaded shank that extends through the opening. A jam nut can be used to progressively close the glands together, not only piercing and securing the metal gasket, but causing the edges of the gasket to extend horizontally outwardly to thereby seal a bore in which the glands are located.

The gasket for the present invention is unique, comprising an annular disk formed with a central vertical opening and with an annular flange thicker than the disk, integral with an edge of the disk. In one particular embodiment, the flange is disposed on the circumference of the disk. In another embodiment, the flange is disposed at the central opening of the disk. The flange extends equally from both sides of the disk and is formed on each side with flat horizontal surfaces.

BRIEF DESCRIPTION OF THE DRAWINGS

FIG. 1 is a perspective view of a gland of this invention and associated gasket, such as would be applied to a mass flow meter or mass flow controller or the like;

DETAILED DESCRIPTION

Figure 1:
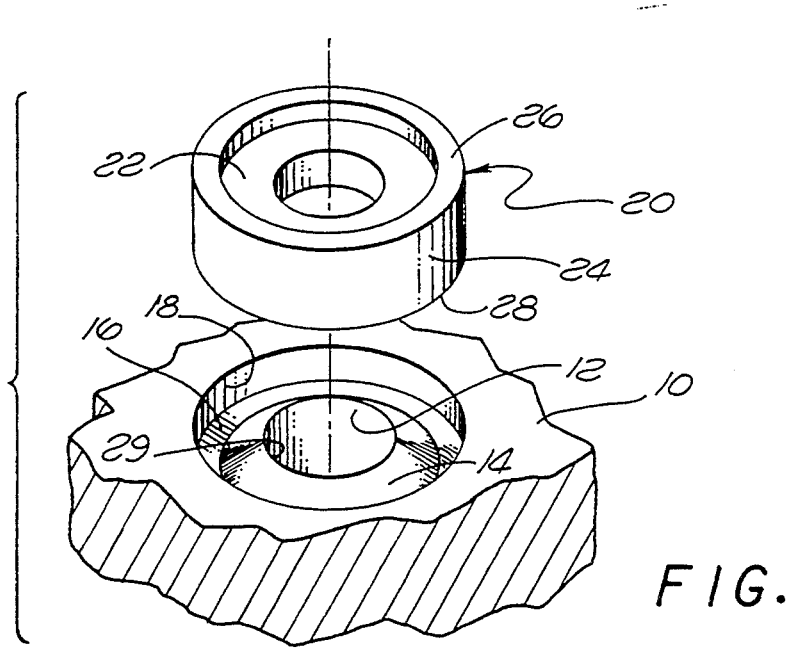
Figures 2A, 2B:
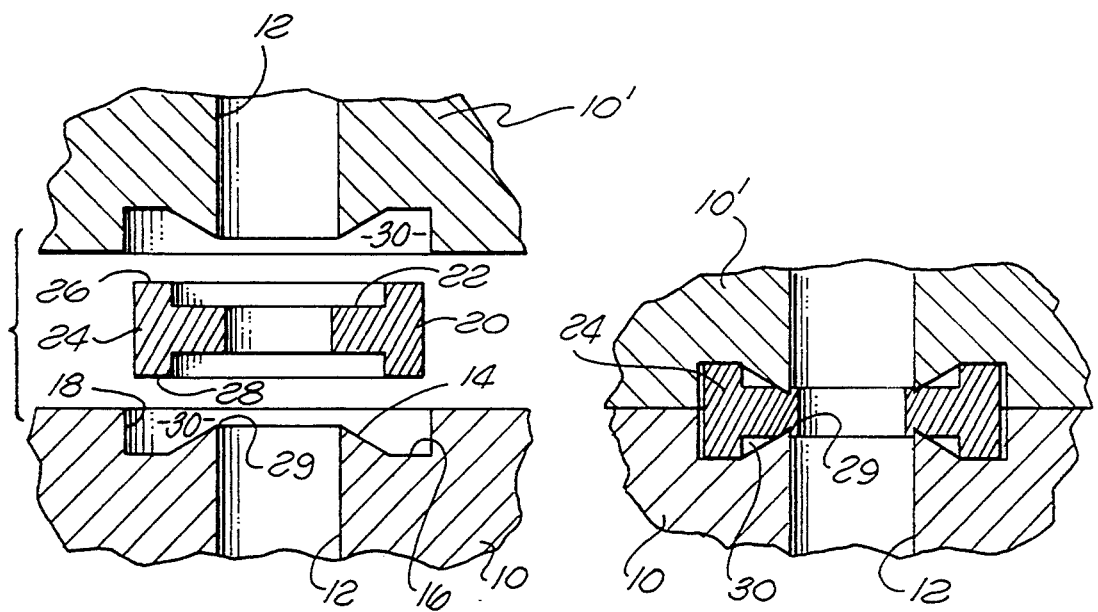
FIGS. 2A and 2B are cross-sectional views of the open and closed configurations, respectively, of a particular gland and metal gasket combination of this invention.

Referring to FIGS. 1 and 2A, in a typical installation, a gland 10, such as found on a mass flowmeter or mass flow controller or the like, is machined so as to form a cylindrical port 12, the edges of which are defined by an annular ridge 14, an adjacent annular flat surface 16, normal to the vertical extent of the bore 12, and an annular wall 18, normal to the base surface 16. The ridge 14, surface 16 and wall 18 are integral members of the gland, formed by machining. The surface 16 will be referred to as a "free" base surface in the sense that it is a portion of the base that has no integral components, although it will be engaged with a component of the gasket 20.

The gasket 20 may be formed in one piece with an annular disk section 22 and with a flange 24 which, in this embodiment, is formed integrally with the disk 22 on its outer circumference. The flange 24 extends vertically on both sides of the disk 22 and has opposite flat surfaces 26 and 28. The gasket may be made of a rigid but maleable material such as maleable metal (e.g. nickel) or teflon.

As shown more clearly in FIG. 2A, the gland ridge 14 extends vertically from the free base surface 16 and terminates in a sharp edge 29. The ridge 14, free base surface 16, and wall 18 define a groove 30 for receiving the gasket flange 24. Again as shown in FIG. 2A, an identical gland structure 10' is formed in a mating component and the components of that gland are identical to the components of the first described gland 10. The gland 10' and 10 are disposed in opposed, face-to-face relationship and cooperate to receive the gasket in the grooves 30.

The gasket 20 is disposed on one of the glands and is automatically centered and self registered not only by the uprising ridge 14 but also by the groove 30. The two gland components are then brought together, as shown in FIG. 2B, whereby the sharp edges 29 pierce the disk portion 22 of the metal gasket.

As shown most clearly in FIG. 2B, the dimensions of the gasket flange 24 and the opposing grooves 30 form a tight fit, but sealing of the device takes place at the penetration points of the ridge edges 29 and gasket disk section 22.

A number of advantages are presented by the foregoing structure. First, the flange of the gasket cooperates with the configuration of the groove so as to form a limit or stop, limiting the penetration of the adjacent ridge. As a result, even if the opposing ridge edge is dull, it will be forced into the metal gasket. If this stop were not present, and one of the ridges had a sharp edge 29, where the other was dull, the sharp edged ridge would penetrate the metal while the other would not. As a result, there would be a danger of leakage past the other, dull ridge and/or the creation of a dead volume between the dull ridge and the gasket flange. The lack of dead volume enables the gland to be effectively swept before sealing.

Second, because of the balanced design afforded by the limiting nature of the gasket flanges, a relatively dense metal can be used for the gasket, such as nickel, which does not out-gas when raised to high temperatures. The assembly can be placed in a baking environment without loosing its integrity or contaminating the fluid.

Third, the grooves are sized to the flanges, that is, the surfaces are mating. As a result of this and the symmetrical circular configuration, the gasket is centered and self registered on the annular ridge. This enables the glands to be assembled at virtually any attitude, even when turned sideways 180°. Also penetration is controlled to be equivalent from both sides, which prevents improper sealing and prevents the metal seal from being severed.

Still another advantage is that the seal is accomplished by piercing the gasket so that highly polished surfaces are not necessary, therefore making the glands machinable in one pass at relatively low cost. The design also provides for off-site maintenance using metal seals without the extensive surface preparation equipment normally needed when flat metal seals are used against flat surfaces.

Figure 3A:
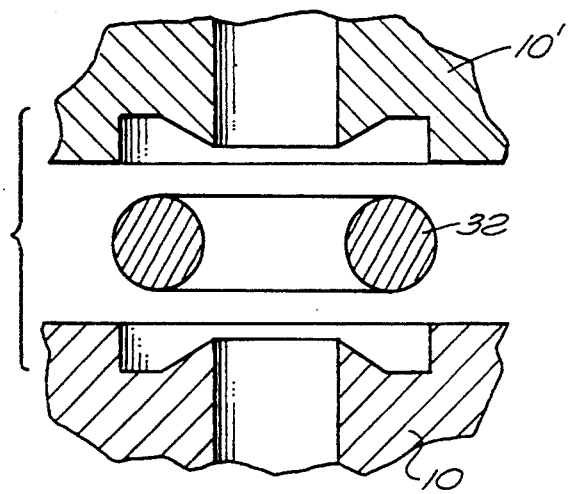
FIGS. 3A and 3B are cross-sectional views of the open and closed configurations, respectively, of the glands of FIGS. 2A and 2B but with a rubber O-ring in place of the metal gasket.
Figure 3B:
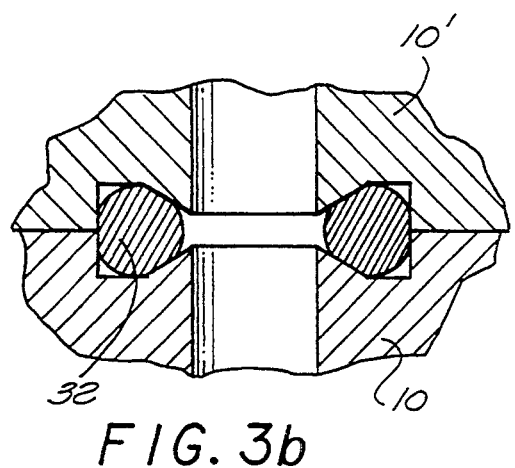

Another advantage is that the glands can accommodate seals other than the custom fit flanged metal gaskets. This results in a reduction of parts inventory for manufacturers requiring multiple seal methods. Referring to FIGS. 3A and 3B, there is shown a pair of glands of identical construction to those in FIGS. 2A and 2B but in which the gasket is a common elastomer O-ring 32. The annular ramp formed by the ridge serves well to seat the O-ring. As appropriate design criteria, the nominal 20% squeeze of a standard size O-ring can be provided for proper sealing. Not only does the configuration accommodate the use of an O-ring when that is desired, but even when a metal gasket is ultimately to be used, the parts can be sealed temporarily with an O-ring for testing purposes prior to final sealing with a metal gasket or by welding.

Figure 4:
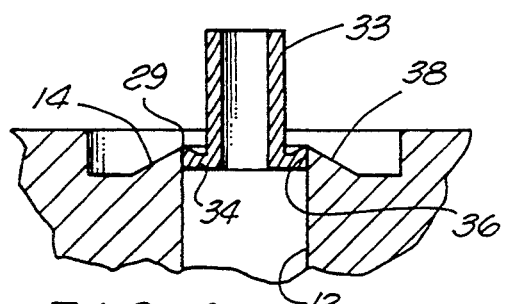
FIG. 4 is a cross-sectional view of a gland of this invention shown in position for welding with a conduit component.

Referring now to FIG. 4, another advantage of the gland configuration is shown in that the very same gland provides an adequate weld relief for the use of a complimenting weldment fitting, here in the form of a conduit 33 having a base 34 which is disposed within the port defined by the annular ridge 14. The sharp ridge edge 29 allows proper heat transfer, or flow, facilitating the welding process.

The ridge 14 of FIGS. 2–4 has a triangular cross-section in which one edge 36 extends as a vertical continuation of the cylindrical port opening 12. The opposite edge 38 is sloped at an angle of about 45°. When used with a metal gasket, as in FIGS. 2A and 2B, the ramp serves to provide a knife edge to the ridge. When used with an elastomer O-ring as in FIGS. 3A and 3B, the ramp serves to provide desired squeeze to the O-ring. When used with the weldment of FIG. 4, the ramp serves to decrease the volume of the ridge enabling better heat transfer.

Figure 5:
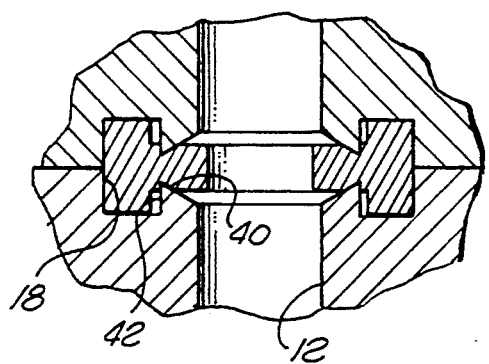
FIG. 5 is a cross-sectional view of the closed configuration of a gland and gasket combination of another embodiment of this invention.

Referring to FIG. 5, a gland structure is shown which is identical to that of FIGS. 2–4, but in which the cross-sectional surfaces of the ridge are reversed. In FIG. 5, the surface 40 of the ridge adjacent the port opening 12 is ramped, e.g., at 45° whereas the opposite surface 42, which defines the groove 26 with wall 18, is vertical.

Figure 6:
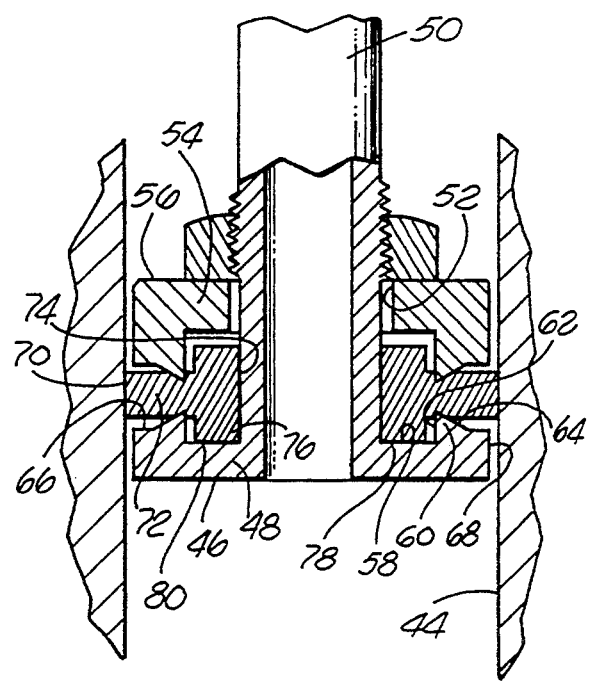
FIG. 6 is a cross-sectional view of the closed configuration of another embodiment of this invention in which a pair of glands and metal gasket are used to seal a bore.

Referring now to FIG. 6, another embodiment of the invention is shown wherein a similar gland structure is used to seal a bore 44. Here, the two glands are not identical in construction but cooperate with each other and with a metal gasket to cause the outer edges of the gasket to press against the walls of the bore and form a seal. The gasket is also of a different configuration than previously discussed.

In this embodiment, one of the glands, for convenience referred to as the lower gland 46, has an annular base 48 and extending centrally upwardly therefrom and integral therewith is a threaded shank 50. The shank 50 extends through a central opening 52 in the base 54 of another gland 56. Other than the fact that the lower gland 46 is formed with a threaded shank 50 and the upper gland 56 is formed with a central opening 52, the glands are otherwise identically constructed. The glands each contain an annular free, flat base surface 58 and radially outwardly therefrom a ridge 60 formed with a vertical inner surface 62 and a ramped outer surface 64. The glands have radial extensions 66 that terminate in a vertical base surface 68 that, when the glands are assembled, define, with the bore wall 44, a fluid path that is interrupted by the gasket 70.

The gasket 70 of FIG. 6 is somewhat the inverted form of the gasket 26 of FIGS. 1–5. The gasket is in the form of a disk 72 having a central opening 74 and a flange 76 in the gasket's central opening. As in the gasket of FIGS. 1–5, the flange 76 extends equally from both sides of the disk 72 and is formed with opposite flat horizontal surfaces 78. When the two confronting glands are assembled, the shank 50 on the lower gland 46 serves as a wall for both glands which, in conjunction with the free, flat surfaces 58, and the ridges 60, define a groove 80 for the flange 76 of the metal gasket 70.

A jam nut 82 is threaded into the shank 50. In operation, as one turns the jam nut 82, the opposing glands are squeezed together with the ridges 60 penetrating the disk portion 72 of the metal gasket 70. As the ramp portions of the ridges 60 extend into the gasket, they force the disk portion of the shank radially outwardly making tight contact with the wall defining the bore 44.

While preferred embodiments of the invention have been shown and described, it is to be understood that the invention may be embodied in other modified forms without departing from the spirit and scope of the invention.

I claim:

1. A sealing device comprising a gasket and first gland for engaging said gasket in a fluid path to prevent leakage of fluid past said gasket, comprising:
   said gasket comprising an annular disk formed with a central opening, and with an annular flange thicker than said disk integral with an edge of said disk and extending from both sides of said disk;
   a base on said gland defining a cylindrical vertical surface alongside said fluid path as a cylindrical bore through said base, said base having a free surface normal to said fluid path formed to support said gasket;
   an annular ridge integral with and having one side extending from the free surface of said base, the other side of said ridge extending as a vertical continuation of said cylindrical surface so as to define in cross-section an acute angle terminating in a sharp edge formed to penetrate a surface of said gasket;
   an annular wall integral with said base, extending normal to the free surface of said base and spaced radially from said cylindrical surface, said ridge and said wall defining an annular groove for said gland receiving the annular flange of said gasket disposed in said groove;
   the annular flange on said disk constituting means for limiting and controlling penetration of said ridge into said gasket, said flange being of a dimension to cooperate with said gland whereby the penetration of said ridge is sufficiently less than the thickness of said gasket so as to limit and control penetration by said ridge into said gasket.

2. The device of claim 1 in which said ridge has a triangular cross-section.

3. The device of claim 1 in which the vertical extent of said flange is substantially equal on both sides of said disk.

4. The device of claim 1 in which said gasket is of non-resilient metal, soft enough to be penetrated by the edge of said ridge.

5. The device of claim 1 including a second gland having a free base surface and an annular ridge disposed in opposed, face-to-face relationship to, and cooperating with the free base surface and annular ridge of the first gland to receive said gasket between said glands, said limiting means preventing the penetration of each ridge into said gasket disk sufficiently to limit and control penetration by either ridge into said gasket.

6. The device of claim 5 in which the base of each gland is in the form of an annulus, the circumference thereof defining said cylindrical surface.

7. The sealing device of claim 5 in which the free surfaces of said bases are flat and the outer surfaces of said gasket flange on opposite sides of said disk are flat.

8. The device of claim 5 in which the base of each gland defines its cylindrical surface as a cylindrical bore and each base includes an annular cylindrical wall integral therewith, extending normal to the free surface of said base and spaced radially from said cylindrical bore, the opposing ridge and adjacent free surface of each base defining an annular groove for said device for receiving said gasket.

9. The sealing device of claim 1 in which said gasket is of hard, dense, non-resilient metal, the flange of said disk being formed with outer and inner side surfaces, said inner side surface extending normal to said disk.

* * * * *